No. 796,016. PATENTED AUG. 1, 1905.
H. ROBINSON.
KNIFE GRINDING MACHINE.
APPLICATION FILED SEPT. 1, 1904.

No. 796,016. PATENTED AUG. 1, 1905.
H. ROBINSON.
KNIFE GRINDING MACHINE.
APPLICATION FILED SEPT. 1, 1904.

Witnesses
Inventor:
Hanson Robinson,
By Dodge and Sons, Attorneys.

No. 796,016. PATENTED AUG. 1, 1905.
H. ROBINSON.
KNIFE GRINDING MACHINE.
APPLICATION FILED SEPT. 1, 1904.

Witnesses
Inventor:
Hanson Robinson,
By Dodge and Sons,
Attorneys

No. 796,016. PATENTED AUG. 1, 1905.
H. ROBINSON.
KNIFE GRINDING MACHINE.
APPLICATION FILED SEPT. 1, 1904.

Witnesses
Inventor:
Hanson Robinson,
By Dodge and Sons,
Attorneys.

UNITED STATES PATENT OFFICE.

HANSON ROBINSON, OF HANOVER, PENNSYLVANIA, ASSIGNOR TO THE MILLER BROTHERS CUTLERY COMPANY, OF MERIDEN, CONNECTICUT, A CORPORATION OF CONNECTICUT.

KNIFE-GRINDING MACHINE.

No. 796,016.      Specification of Letters Patent.      Patented Aug. 1, 1905.

Application filed September 1, 1904. Serial No. 223,033.

*To all whom it may concern:*

Be it known that I, HANSON ROBINSON, a citizen of the United States, residing at Hanover, in the county of York and State of Pennsylvania, have invented certain new and useful Improvements in Knife-Grinding Machines, of which the following is a specification.

My present invention pertains to improvements in knife-grinding machines, the construction and advantages of which will be hereinafter set forth, reference being had to the annexed drawings, wherein—

Fig. 18, a vertical sectional view of a portion of one of the grinder-spindles and its attendant parts; Fig. 19, a side elevation, partly in section, of one of the elbow-levers and connecting-links employed to elevate the grinders, and Fig. 20 a diagrammatic view showing the manner of driving the grinder-spindles.

The main object of my invention is to produce an automatic knife-blade-grinding machine. With a machine constructed in accordance with my invention the blanks after being properly positioned on the holders are automatically clamped thereon and successively presented to a series of grinders, the first set of which cut away the face or body of the blank to the desired degree and finish it, after which the remaining grinders give to the nose or end of the blade the desired curvature and reverse bevel, (or any other form, as the case may be,) as is usual in knife-blades. The blades thus finished are automatically released from the clamps one by one and delivered to a point outside of the machine proper, the stand or holder thus cleared moving to a point where a new blank is presented thereto.

A further object of the invention is to provide means whereby the angle-grinders may be adjusted with reference to the work both as to their degree of inclination thereto and also as to the length of the stock, whereby they may be positioned so as to grind various angles upon or adjacent to the outer rounded end of the knife-blade.

Other features of practical importance are present, and the advantages thereof will be pointed out in the following description.

Figure 1:
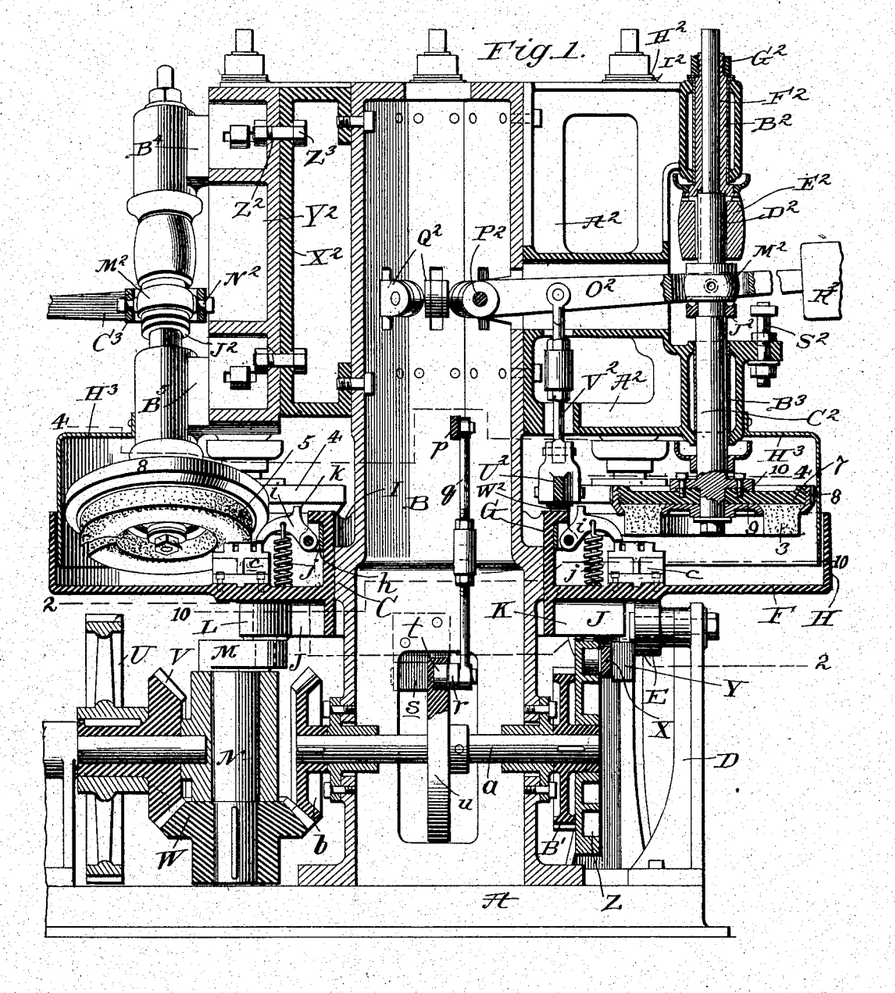
Figure 1 is a vertical sectional view of the machine, certain portions which would appear in perspective at the rear thereof being omitted for the sake of clearness.
Figures 3, 5:
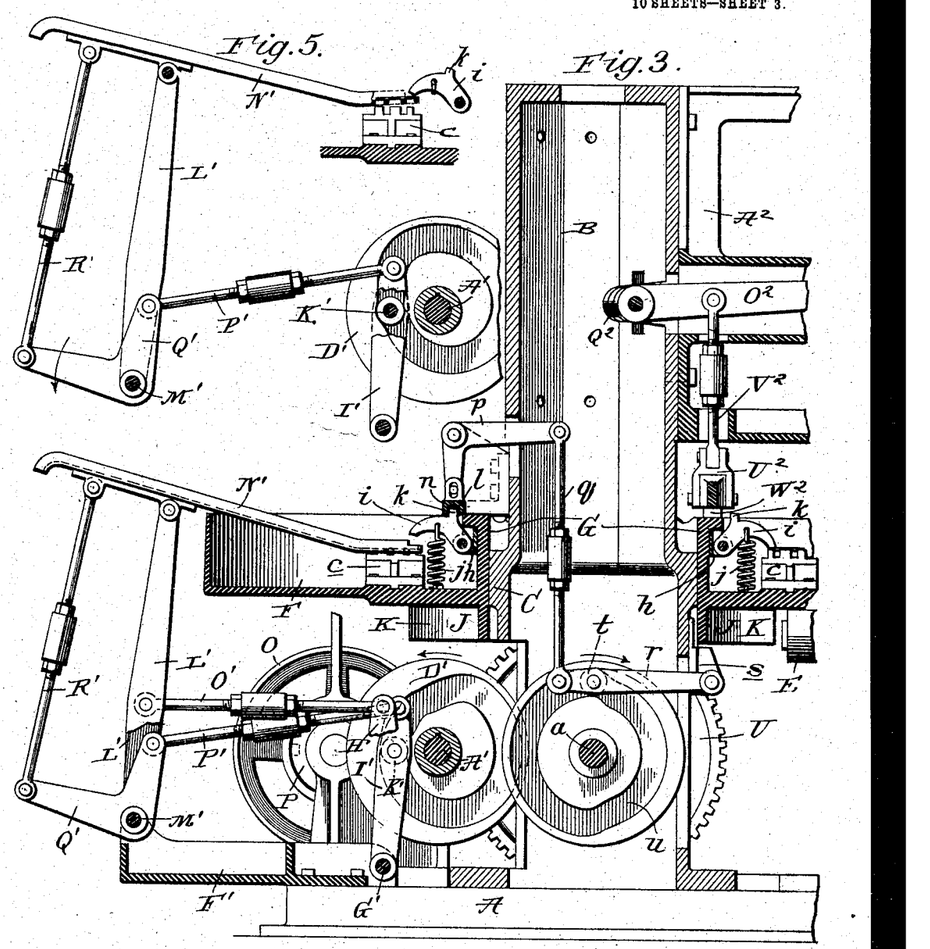
Fig. 3, a vertical sectional view on the line 3 3 of Fig. 4, portions of the machine being omitted.
Figs. 5 and 6, side elevations of the blank-discharging mechanism shown in two different positions.
Figures 4, 6:
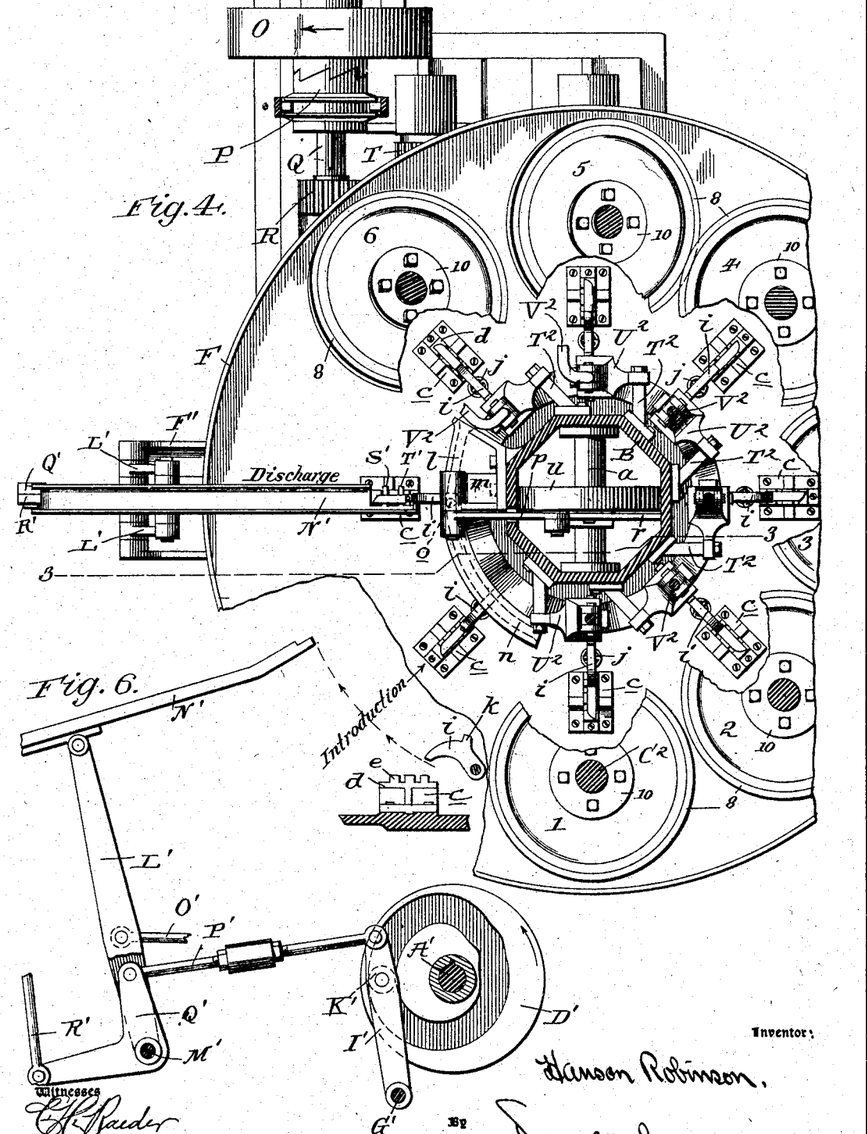
Fig. 4, a horizontal sectional view on the line 4 4 of Fig. 1, the grinders being broken away to more clearly disclose the blank-supports and their attendant parts.
Figure 10:
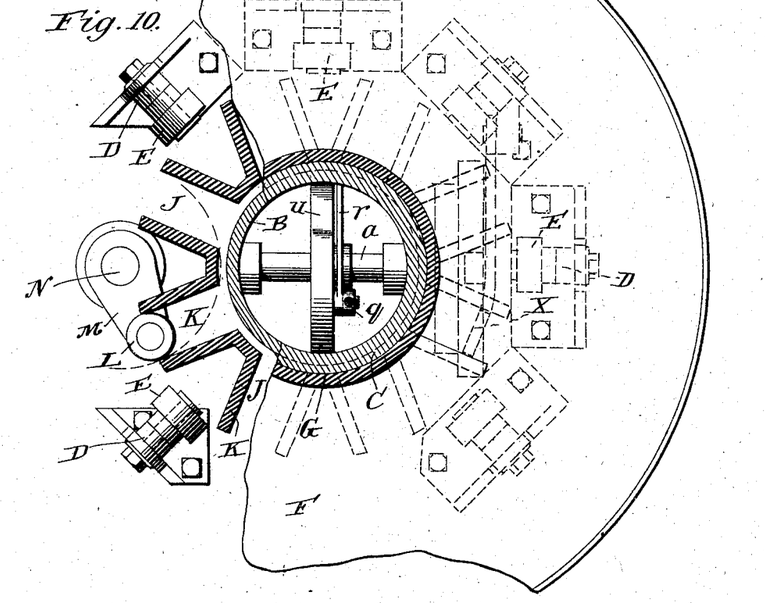
Fig. 10, a horizontal sectional view on the line 10 10 of Fig. 1, designed to show the manner in which the rotary pan is supported and periodically rotated or given a step-by-step motion.

A denotes a suitable base, upon which is mounted and secured a hollow column B, the lower portion of which is preferably cylindrical and provided with an external collar C. The upper portion of the column is octagonal in cross-section, as shown in Fig. 4. Secured to and extending upwardly from the base is a series of posts or standards D, Figs. 1 and 10, each of which carries a short stud-axle, upon which is mounted a roller E. Said rollers form the support for a pan F, which, as best shown in Figs. 1, 3, and 10, is provided with a central hub G, that bears against and rotates about the collar C. Hub G extends upwardly to approximately the same height as the outer rim H of the pan and is provided with a series of cams I or elevations or depressions, (see Fig. 14,) the purpose of which will presently appear. The under face of the pan (see Figs. 1, 3, and 10) is provided with a series of radial ways J, formed by downwardly-projecting wings K, preferably cast integral with the pan. Said ways stand in line with a bowl or roller L, secured upon the outer end of a crank or arm M, carried by a vertically-disposed shaft N.

Figure 2:
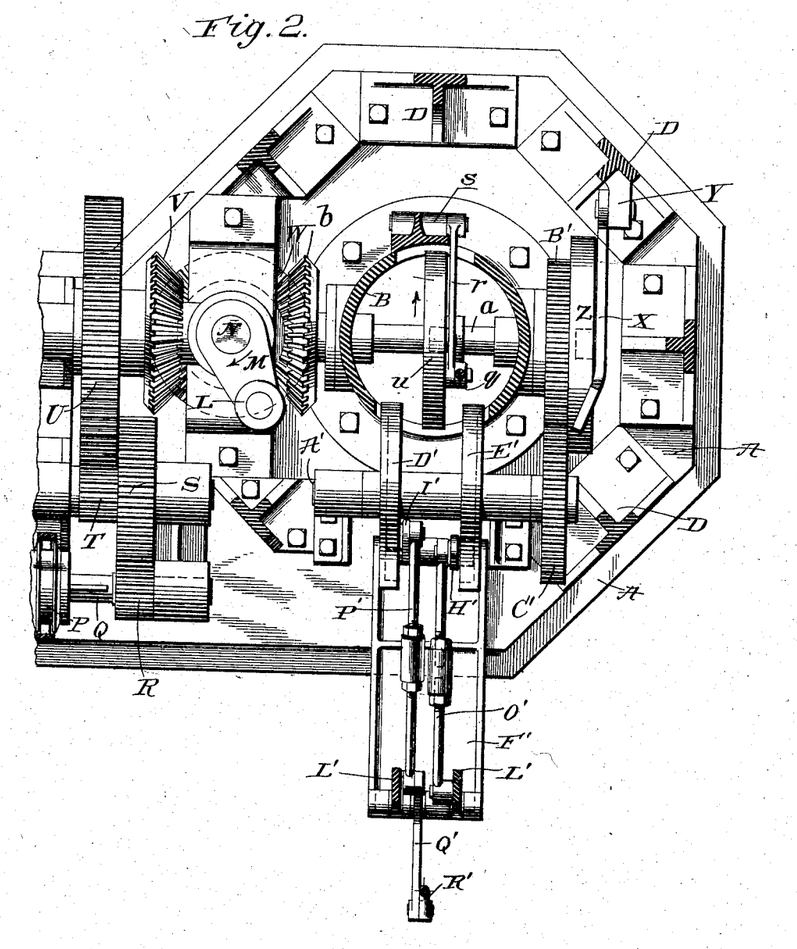
Fig. 2, a horizontal sectional view on the line 2 2 of Fig. 1.
Figure 9:
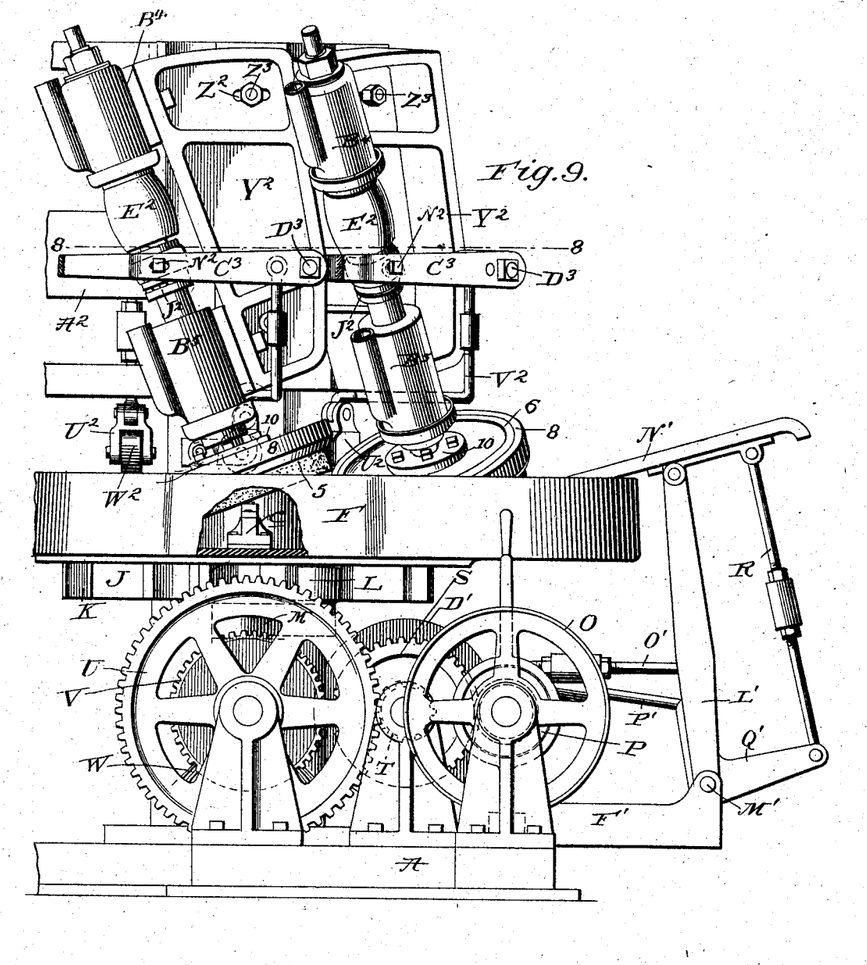
Fig. 9, a side elevation of a portion of the machine, showing the manner in which the angle-grinders are supported.
Figure 11:
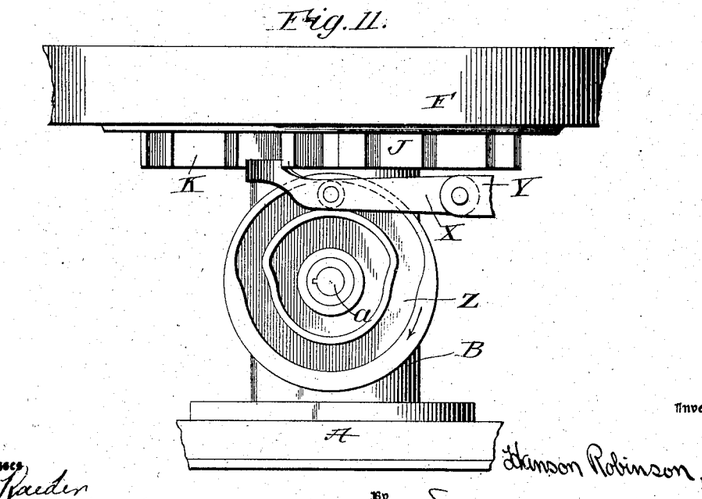
Fig. 11, a side elevation of a portion of the pan and the locking-lever therefor, which serves to hold the pan against movement while the grinders are working upon the blanks.

O, Fig. 9, indicates the constantly-driven belt or power-pulley, and a sliding clutch P, Figs. 2 and 4, transmits motion therefrom to a shaft Q, carrying a pinion R. Motion is imparted from said pinion to shaft N through gear S, pinion T, gear U, bevel-gear V, (mounted upon the same shaft as gear U,) and bevel-gear W, secured upon the lower end of shaft N. As said shaft is turned it carries with it arm M and roller L, the latter passing into one of the radial ways J and causing the pan to rotate counter-clockwise until such time as the roller shall pass out of the way. The pan then comes to rest with another way in line with the path of movement of the actuating-arm and its roller. It is then desirable to lock the pan against movement until such time as roller L shall again enter one of the ways J, and in order to accomplish this I employ a locking lever or arm X, Figs. 2 and 11, the arm being pivoted to a bracket Y, extending outwardly from one of the standards D. The upturned free end of the lever passes into one of the ways J when the lever is elevated, as shown in Fig. 11. The alternate elevation and depression of this lever is accomplished by a cam Z, secured upon the end of a shaft $a$, which is mounted in the lower portion of column B. Said shaft derives its motion from a bevel-gear $b$, which meshes with gear W. The parts will of course be so timed that the locking-lever is released just previous to a further movement of the pan by arm M. By reason of the gearing employed shaft N has a relatively slow movement, and the pan consequently remains locked in its position of rest a sufficient length of time to enable the grinders to accomplish their work.

Figures 15, 16, 17:
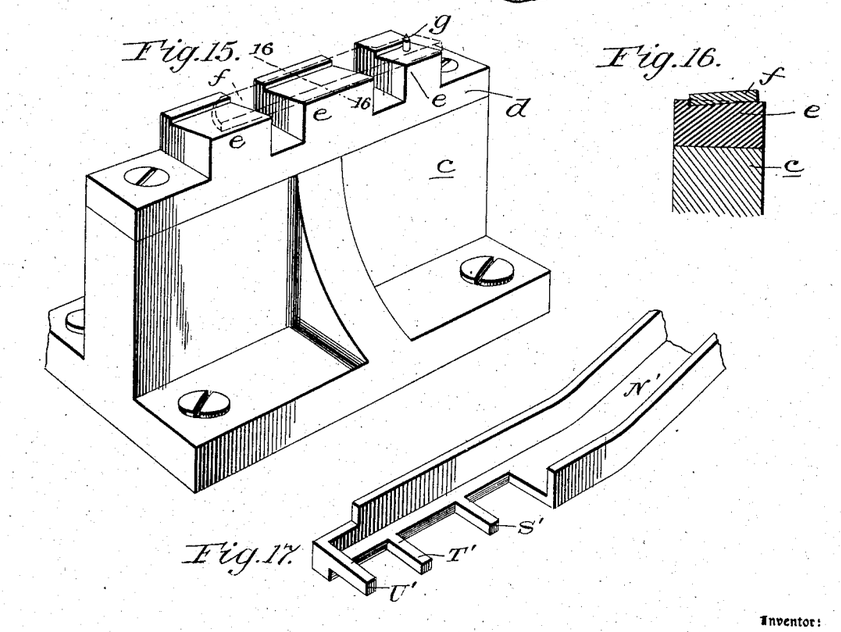
Fig. 15, a perspective view of one of the blank supports or holders.
Fig. 16, a transverse sectional view on the line 16 16 of Fig. 15.
Fig. 17, a perspective view of the inner end of the discharge-chute.

Mounted within the pan concentric with the axis thereof and evenly spaced one from the other is a series of supports or holders for the blanks to be ground. In the machine shown eight of these supports are employed, and inasmuch as they are all constructed alike a description of one will suffice. Upon reference to Fig. 15 it will be seen that the holder comprises a base $c$, which is secured to the pan, and a removable top plate $d$, having a series of upwardly-extending fingers or posts $e$, the upper face of each post being cut away, as shown, thus forming a seat for the blank, (indicated by $f$ in Fig. 16.) A pin $g$, extending upwardly from the upper face of the innermost finger $e$, passes through the pivot-opening formed in the tooth or shank of the knife-blade as the same is put in place by the attendant. A bracket $h$ is secured to hub G in line with each of the holders, and a clamp or clamping finger $i$ is pivoted to said bracket. Normally the clamp is depressed by a spring $j$, the outer end of the clamp resting upon the shank of the blade when the same is in position upon the holder, except at such time as the clamp is automatically raised to permit the discharge of the finished blade and the introduction of a new blank to take its place upon the holder.

With the machine illustrated six grinders are shown, 1, 2, 3, and 4 designating the face-grinders and 5 and 6 the angle-grinders. The details of these parts will be hereinafter described. The point of discharge of the finished blade or blank and the point of introduction or feed of a new blank lie between the grinders 1 and 6, as best indicated in Fig. 4.

Figure 12:
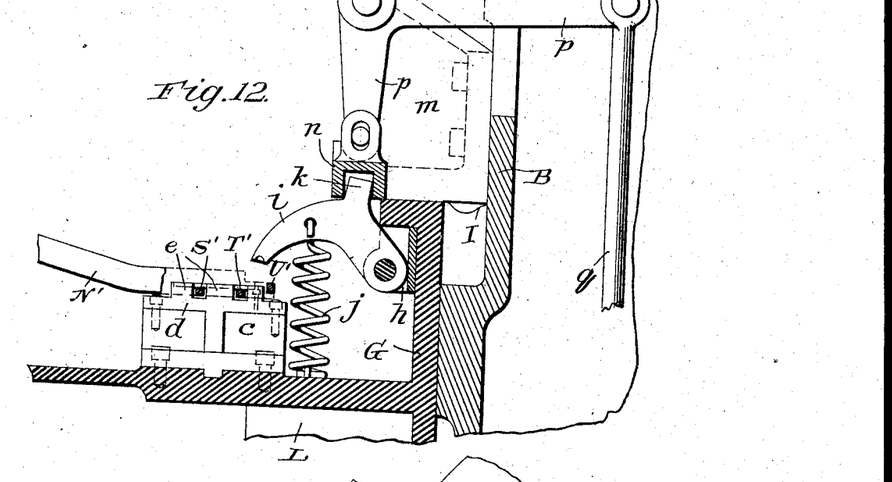
Fig. 12, a sectional elevation of the blank-clamp-releasing mechanism, the clamp being at the point of discharge and shown in its elevated position.
Figure 13:
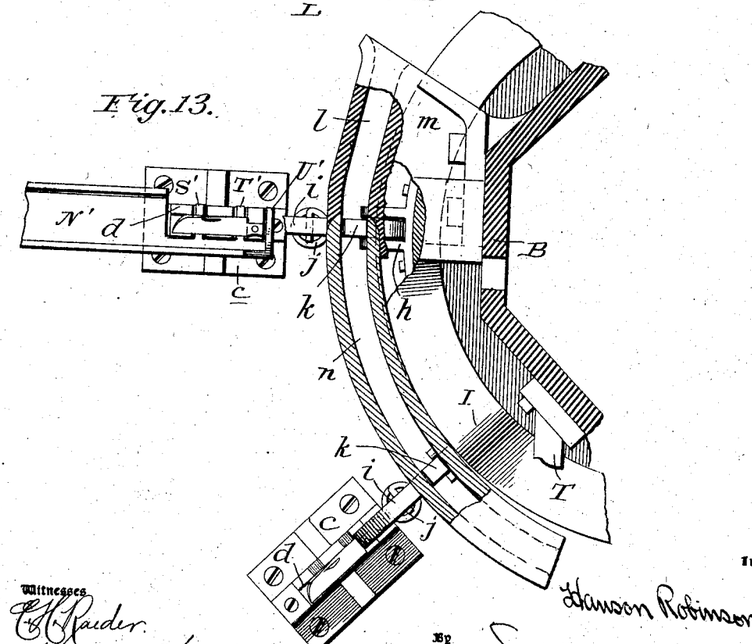
Fig. 13, a horizontal sectional view of the same, the pivoted section or track of the releasing mechanism being moved outwardly to permit the clamping-finger to swing downwardly to clamp the newly-positioned blank.
Figure 14:
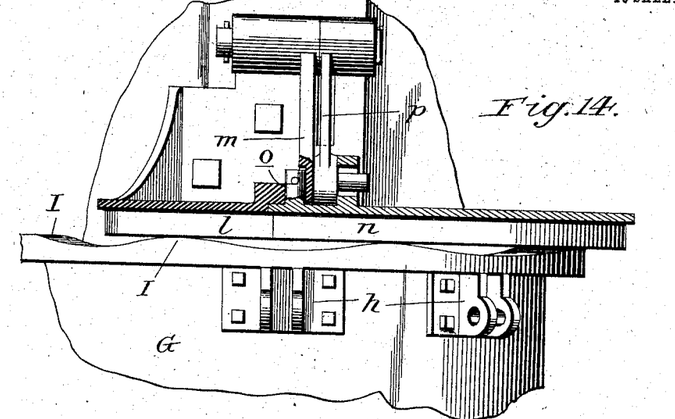
Fig. 14, a side elevation, partly in section, of the track and operating mechanism, the clamps being omitted.

To effect the automatic clamping and releasing of the blanks, each clamp is provided with an upwardly-extending lug or finger $k$, which when the pan is rotated passes into a guideway or track $l$, formed in a casting or bracket $m$, secured to the column B. (See Figs. 12, 13, and 14.) As will be seen most clearly upon reference to Fig. 13, the mouth of the track or way is slightly flared, so that the finger $k$ may properly enter the same, as the relative position of the finger will vary according to the thickness of the stock clamped. The track also lies in a plane tangential to the axis of rotation of the pan, so that by the time the finger and the holder carrying the finished blade reach the point of discharge the finger will be thrown back to its greatest extent and the clamp consequently attain its highest possible elevation, as shown in Fig. 12, when the blade will be automatically raised from the holder and discharged from the machine by mechanism presently to be described. To maintain the clamp in its elevated position in order that a new blank may be introduced, a track-section $n$, pivoted at $o$ to bracket $m$, Fig. 14, is employed, said pivoted section forming a continuation of the fixed track $l$. Track-section $n$ is moved toward and from the blank-holder $c$ by a bell-crank lever $p$, the lower end of the downwardly-projecting arm of which is pin-jointed to the track $n$, while the horizontally-disposed arm of the lever extends into the column B and is connected to a link or connecting-rod $q$, Figs. 1, 2, 3, and 12. The lower end of the link is in turn connected to an arm or lever $r$, fulcrumed upon a bracket $s$, secured to the lower portion of the column, the arm carrying a roller $t$, which works in the groove of a cam $u$, mounted upon shaft $a$. The cam is so timed as to hold the pivoted track-section $n$ inwardly toward the column at the time the blank is discharged and to maintain it in this position during the movement of the pan from the point of discharge to the point of introduction, at which time the attendant will place a new blank upon the holder from which the finished blade has just been delivered. During the next step in the rotation of the pan from the point of introduction to the first grinder cam $u$, acting through the connections above described, will cause the track-section $n$ to swing outwardly, thereby permitting the clamp to gradually move down upon the blank and hold the same in place. Finger $k$ will be entirely clear of the track before the clamped blank comes into the field of action of grinder 1.

Figure 7:
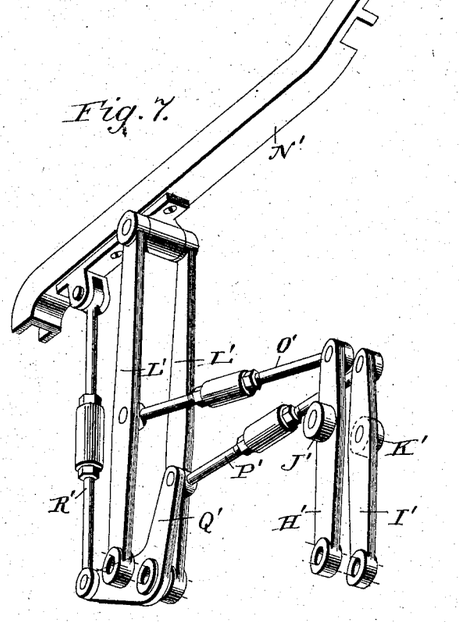
Fig. 7, a perspective view thereof viewed from the under side.

To provide for the positive release of the finished blank from the holder and its delivery to a point outside of the machine—as, for instance, to a receptacle or endless conveyer—I employ a releasing and delivery mechanism. (Best illustrated in Figs. 2 to 7, inclusive, and Fig. 17.) Mounted upon a shaft $A'$, which receives its motion from shaft $a$ through gears $B'$ $C'$ are two cams $D'$ $E'$. Secured to the base A and extending outwardly therefrom is a bracket or supporting member $F'$. A cross-shaft $G'$, mounted at the inner end of said member $F'$, forms the pivot of two rocker-arms $H'$ $I'$, said arms carrying rolls $J'$ $K'$, respectively, which work in the grooves of the cams $D'$ $E'$. These cams are the same in general form, cam $D'$, however, being set slightly in advance of cam $E'$, for a purpose which will presently appear. A pair of arms or levers $L'$ $L'$ is mounted upon a shaft $M'$, carried at the outer end of bracket $F'$, said levers in turn being pivotally connected at their upper ends to the releasing and delivery chute $N'$, Fig. 7. An adjustable link or rod $O'$ extends from the upper end of rocker-arm $H'$ to one of the levers $L'$, so that as said rocker-arm is moved back and forth by its cam $E'$ a like motion is imparted to said levers $L'$ $L'$. Consequently the chute is moved bodily endwise and its fulcrum about which it is tilted is likewise shifted back and forth. This tilting action is effected by cam $D'$, acting through rocker-arm $I'$, link $P'$, bell-crank lever $Q'$, and rod $R'$, connected to the chute near its outer end. Chute $N'$ is trough-shaped in cross-section, the outer end thereof being curved downwardly, as indicated in Fig. 7, while its inner end (see Fig. 17) is cut away, forming three fingers $S'$, $T'$, and $U'$. Fingers $S'$ $T'$ pass into the spaces intermediate the posts $e$, while finger $U'$, which lies in a plane above the others, occupies a position immediately in rear of the blank when the parts are in the positions shown in full lines in Figs. 3 and 4. The cams are so timed that as the pan rotates, carrying a finished blank from grinder 6 toward the point of discharge, the chute will be positioned as shown in Fig. 3—that is to say, the fingers $S'$ and $T'$ will lie in a horizontal plane coincident with the openings or spaces formed between posts $e$ and the knife-blade which they support, while finger $U'$ will be in a position to pass behind the end of the shank of the blade. As the pan reaches the point of discharge it will come to rest and remain locked in such position for a determinate length of time. Meanwhile the chute-fingers will have properly positioned themselves beneath and behind the finished and unclamped blade and the cams $D'$ $E'$ will come into action. Cam $D'$ first tilts the chute to a slight extent, sufficient only to release the blade from the retaining-pin $g$. (See Fig. 5.) Cam $E'$ then acts to move the chute endwise, so as to clear the clamp $i$. After this is effected both cams act to tilt the chute and throw it bodily outward to the position shown in Fig. 6, thereby causing the blade to travel along the inclined chute to the receptacle provided therefor. Finger $U'$, as will be noted, prevents the blade from being thrown out or passing off the inner end of the chute. The latter will remain in its elevated position until the support from which the blade has just been removed has traveled a sufficient distance to permit the inner end of the chute to be depressed into line with the succeeding holder and its blade. The particular form of the lifting-fingers on the chute is immaterial. They may be varied to suit different classes of work and also to accommodate themselves to the shape of the removable member $d$ of the knife-blade holder, it being understood, of course, that its form will vary according to the contour of the blade being operated upon.

The same general construction of mounting is employed for all the grinders, those used for the face-grinders 1 to 4 being identical, while the manner of supporting the angle grinders 5 and 6 varies but slightly therefrom, except in the matter of adjustment. A description of the face-grinder mounting will now be given.

Secured to one of the flat faces of the upper portion of the central column B is a bracket or frame $A^2$, Fig. 1, having alined openings formed in its outer end for the reception of bearing sleeves or bushings $B^2$ $B^3$.

$C^2$ designates the grinder shaft or spindle, which has a bearing in the lower bushing $B^3$. Attached to said shaft by suitable keys or splines $D^2$ (see Fig. 18) is a driving-pulley $E^2$, formed with an elongated sleeve $F^2$ projecting from the upper end thereof, said sleeve having its bearing in bushing $B^2$. While the pulley is locked to the shaft, so that the two must rotate in unison, the shaft may still move longitudinally and have at all times a long extended bearing therein, which serves to steady the same and maintain it in proper relation to the work. Pulley-sleeve $F^2$ is held in the desired position by a nut $G^2$ and interposed washers $H^2 I^2$.

Secured to shaft $C^2$ intermediate the upper and lower bushings $B^2 B^3$ is a collar $J^2$, formed with a seat in its upper face for the reception of antifriction-balls. A sleeve $K^2$, pinned to the shaft, rests upon the balls, said sleeve being encircled by a collar $M^2$, held in place by a nut $L^2$, screwed upon the upper end of the sleeve. The opening in the collar is oblong in shape to allow end motion corresponding to the arc through which it moves. Screws $N^2$, secured to collar $M^2$, engage a lever $O^2$, (see Fig. 1,) fulcrumed at $P^2$ between lugs $Q^2$, which extend inwardly from the inner faces of the upper portion of the column B. An adjustable weight $R^2$ is mounted upon the outer end of lever $O^2$ and serves to hold the grinder down to its work. An adjustable stop $S^2$ is mounted in bracket $A^2$ in line with said lever and limits its downward movement, thus permitting the grinder to abrade the blank to a fixed extent only.

Upon reference to Fig. 1 it will be noted that the grinders are secured to a face-plate 7 by a collar 8 and disk 9, the face-plate being bolted to a flange 10, formed upon the lower portion of the spindle.

Figures 18, 19, 20:
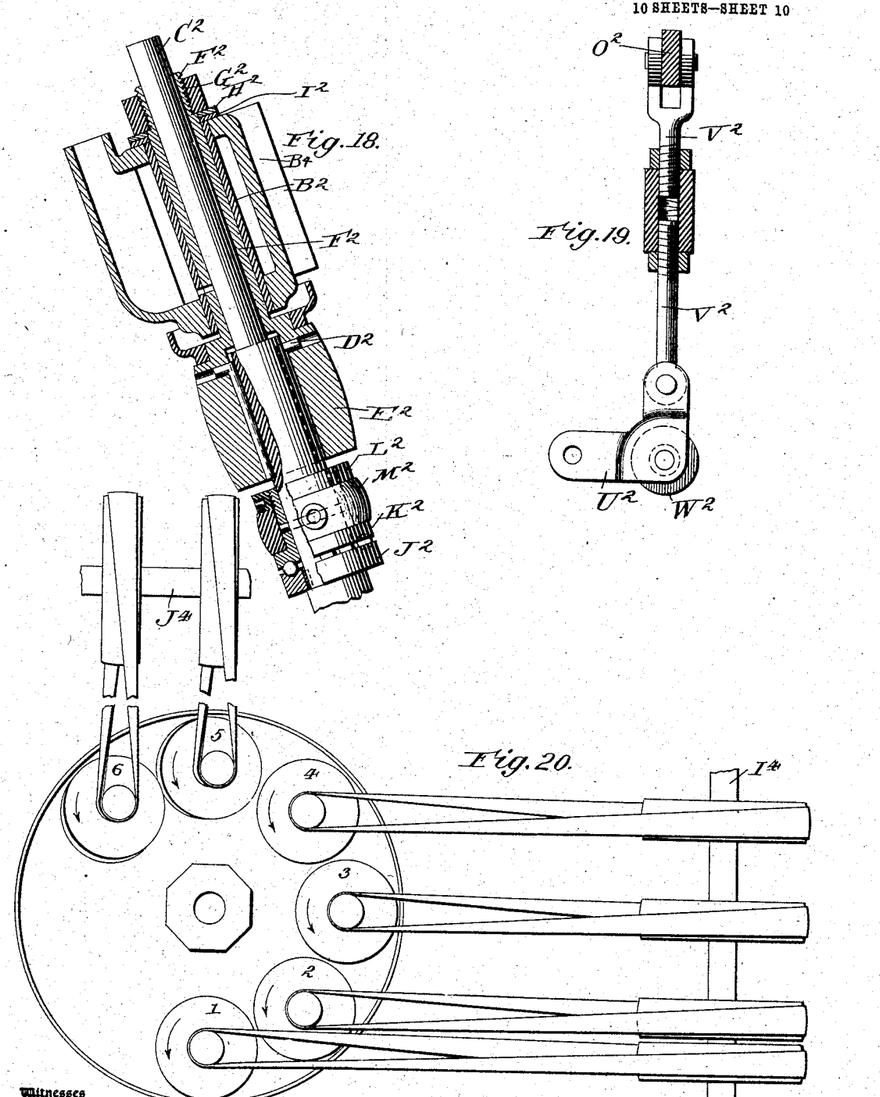

As will be seen upon reference to Fig. 4, an arm $T^2$ is secured to each flat face of the column, said arm forming the pivotal support or fulcrum for an elbow-lever $U^2$, Fig. 19, the opposite end of which is connected to an adjustable link or rod $V^2$, which in turn is attached at its upper end to lever $O^2$. Elbow lever $U^2$ carries a roller $W^2$, which rests upon the upper cam-shaped edge of the hub G of the pan, and consequently as the pan is rotated lever $U^2$ will be oscillated, raising and lowering lever $O^2$ and imparting the same movements to the grinder. Thus it will be seen that all of the grinders rise and fall in unison, the upward movement beginning the moment the pan commences to rotate to pass the blanks from one grinder to another, while the downward movement thereof terminates just as the blank comes into position beneath it, and the pan is locked against further rotation. The angle-grinders 5 and 6, the under faces of which are curved (see $5^a$, Fig. 1) to effect the desired bevel and rounding on the end of the blade, are mounted in substantially the same manner.

Figure 8:
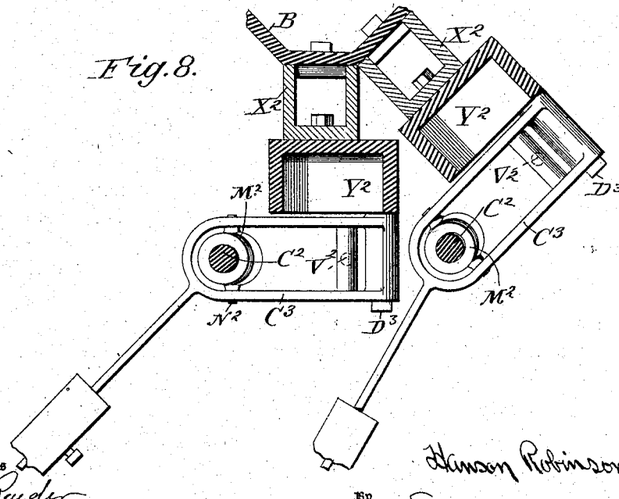
Fig. 8, a horizontal sectional view on the line 8 8 of Fig. 9, showing the detail of the levers employed in conjunction with the angle-grinders.

Secured to the column B (see Figs. 1, 8, and 9) is a block or casting $X^2$, to which is bolted a frame $Y^2$, the lower connecting-bolt forming a pivot about which the frame may be tilted, said frame being formed with a slot $Z^2$, through which the upper securing-bolt $Z^3$ is passed. The upper and lower bearings $B^4$ and $B^5$ of the spindle are adjustably bolted to the inclined face of frame $Y^2$, so that they, together with the spindle, may be moved away from the central column. When this radial adjustment is made, the weighted levers $C^3$, which are fulcrumed on stud-axles $D^3$, extending outwardly from the frame $Y^2$, will likewise be moved outwardly. Provision must also be made for a similar adjustment of the lifting mechanism for the weighted levers. This can be readily effected by moving the lever $U^2$ outwardly upon the supporting-arm $T^2$, the roller $W^2$ maintaining its bearing upon the broad cam-surface of hub G. By reason of the employment of frames $Y^2$ it becomes necessary to bend the lifting links or rods $V^2$ of the angle-grinders to pass around said frames. (See Fig. 9.) Their function and operation are identical with those of the corresponding parts used in connection with the face-grinders. As will be seen upon reference to Fig. 8, it becomes necessary to deflect the outer ends of levers $C^3$ in order that they may not interfere with the other parts immediately adjacent thereto.

In order to prevent the water from being thrown out of the pan by the grinders, I propose to employ a hood for each grinder. This is shown at $H^3$, Fig. 1, the hood being supported from the lower face or portion of frame $A^2$ and projecting downwardly to such depth as to extend slightly into the water in the pan.

In Fig. 20 I have shown diagrammatically the manner in which the various spindles and grinders may be driven, grinders 1 to 4 receiving power from a shaft $I^4$ and angle-grinders 5 and 6 from a shaft $J^4$. Any suitable drive may, however, be used.

It is obvious that the machine herein described will dress but one side of the blanks; but as they are discharged they may be placed in a companion machine which will perform the same operations upon the opposite or undressed side of the blanks.

It will of course be understood that a greater or less number of grinders may be employed and that a larger or smaller number of angle-grinders may be used, or, if desired, entirely omitted. Any means for securing the grinders to the spindles may be employed. So, too, while I have described the construction of the machine in all its details, I do not desire to limit myself thereto, as certain generic features and combinations are set forth herein.

The term "pan" herein employed is to be treated as synonymous with the word "support," except in those claims where a pan construction is essential to the carrying out of the invention.

Having thus described my invention, what I claim is—

1. In a grinding-machine, the combination of a pan or support; a series of blank-holders carried thereby; means for imparting an intermittent movement to said pan or support; a plurality of grinders working in line with said holders; means for rotating said grinders;

means for raising and lowering the same; and means for moving the pan when the grinders are raised.

2. In a grinding-machine, the combination of a rotary pan or support; a series of blank-holders carried thereby; a plurality of grinders working in line with said holders; means for raising and lowering the grinders; means for imparting a step-by-step rotation to the pan; and means for locking the pan against rotation while the grinders are in operation.

3. In a grinding-machine, the combination of a series of blank-holders; a series of face-grinders for the blanks; a series of angle-grinders; and means for traversing the holders from one grinder to another.

4. In a grinding-machine, the combination of a series of blank-holders; a series of face-grinders for the blanks; and a series of angle-grinders, said angle-grinders being adjustable with reference to the length of the holders and also bodily tiltable, substantially as described.

5. In a grinding-machine, the combination of a supporting-column; a blank-holder movable adjacent thereto; and a grinder working over the holder and supported by the column, said grinder being adjustable toward and from the column and tiltable with reference to the holder.

6. In a grinding-machine, the combination of a supporting-column; a blank-holder movable adjacent thereto; a supporting member pivotally connected to said column; a shaft-bearing adjustably carried by said supporting member; a shaft mounted in said bearing; and a grinder carried by the shaft.

7. In a grinding-machine, the combination of a rotary pan or support; a series of blank-holders carried thereby; a series of face-grinders; a series of angle-grinders; means for raising and lowering said grinders simultaneously; and means for imparting a step-by-step movement to the pan.

8. In a grinding-machine, the combination of a rotary pan or support; a series of blank-holders carried thereby; means for automatically clamping the work thereon; a series of grinders; means for raising and lowering said grinders; and means for rotating the pan while the grinders are elevated.

9. In a grinding-machine, the combination of a rotary pan or support; a series of blank-holders carried thereby; means for automatically clamping the work thereon; a series of grinders; means for raising and lowering the grinders; means for locking the pan against rotation when the grinders are in their lowered position; and means for advancing the pan beneath the grinders when the same are elevated.

10. In a grinding-machine, the combination of a rotary pan or support; a series of blank-holders carried thereby; means for retaining the blanks upon said holders; a series of grinders; means for raising and lowering said grinders; means for advancing the pan beneath the grinders when the same are elevated; and means for automatically discharging the finished blank.

11. In a grinding-machine, the combination of a movable support; a series of blank-holders carried thereby; a series of grinders; means for raising and lowering the same; means for moving the support when the grinders are raised; a clamping device for each holder; and means acting on said devices to release the same from the finished work and to hold them in such released position until a new blank is in place and the holder with the blank thereon reaches the initial grinder.

12. In a grinding-machine, the combination of a movable support; a series of blank-holders carried thereby; a series of grinders; means for raising and lowering the same; means for advancing the support when the grinders are raised; a clamping device for each holder; means to release each clamping device successively as it passes away from the last grinder; and an automatic discharge mechanism serving to remove the finished blank thus released.

13. In a grinding-machine, the combination of a movable support; a series of blank-holders carried thereby; a series of grinders; means for raising and lowering the same; means for advancing the support when the grinders are raised; a clamping device for each holder; means for releasing each clamping device successively as it passes away from the last grinder and maintaining it in such released position until a new blank is properly positioned and the holder with the blank thereon reaches the initial grinder; and an automatic discharge mechanism for removing the finished blank.

14. In a grinding-machine, the combination of a support; means for intermittently moving the same; a series of blank-holders; automatically-actuated clamps working in conjunction with the holders; and means acting when the support and holders are at rest for successively releasing the clamps when they reach a predetermined point, substantially as described.

15. In a grinding-machine, the combination of a support; means for intermittently moving the same; a series of blank-holders; automatically-actuated clamps for said holders; and means acting when the support and holders are at rest for releasing the clamps and maintaining them in such released position during a predetermined travel of the support.

16. In a grinding-machine, the combination of a movable support; a series of blank-holders carried thereby; automatically-actuated clamps for said holders; means for releasing the clamps and maintaining them in such position during a predetermined travel of the support, said means comprising a fixed and a movable part; and means for actuating said movable part.

17. In a grinding-machine, the combination of a movable support; a series of blank-holders carried thereby; clamps normally held upon said holders; means for releasing the clamps and maintaining them in such position during a predetermined travel of the support, said means comprising a fixed and a movable part; means for automatically actuating said movable part to permit the clamps to move toward the holders; and a discharging device for removing the finished blanks from the holders when the clamps are in their elevated positions.

18. In a grinding-machine, the combination of a movable support; a series of blank-holders carried thereby; spring-actuated clamps for the holders; means for releasing said holders, comprising a fixed track and a pivoted track, said tracks standing normally in the path of travel of the clamps; and means for shifting the movable track, substantially as described.

19. In a grinding-machine, the combination of a central column; a pan or support rotatable about said column; a series of blank-holders mounted in the pan; a series of clamping-fingers pivoted to the pan; a spring for moving each of said fingers toward one of the blank-holders; a fixed track carried by the column and normally standing in the path of travel of the clamping-fingers; a pivoted track-section forming a continuation of the fixed track; and means for swinging said movable track-section about its pivot.

20. In a grinding-machine, the combination of a column; a pan or support rotatable about said column; means for supporting the same; means for imparting a step-by-step movement to said pan; a series of holders mounted in the pan; a series of grinders supported from the column above the holders; and means for simultaneously raising the grinders from the holders as the pan is given its step-by-step movement, substantially as described.

21. In a grinding-machine, the combination of a column; a pan rotatable about the same; means for supporting the pan; means for imparting a step-by-step movement to said pan; a series of holders mounted in the pan; a series of grinders supported from the column above the holders; weighted levers pivoted to the column and bearing upon the grinders to normally depress the same; and means for raising said levers and thereby lifting the grinders as the pan is advanced a step in its rotation, substantially as described.

22. In a grinding-machine, the combination of a column; a pan rotatable about the same; means for imparting a step-by-step movement to said pan; a series of holders mounted in the pan; a series of grinders supported from the column above said holders; a weighted lever for each of said grinders, said levers being pivoted at their inner ends to the column and acting upon the grinders to normally depress the same; a cam-surface formed upon the pan; and a series of lifter-rods, one for each lever, working in conjunction with said cam-surface to raise the levers at predetermined intervals, substantially as described.

23. In a grinding-machine, the combination of a column; a pan rotatable about the same; means for imparting a step-by-step movement to said pan; a cam-surface formed upon the upper face of the hub of the pan; a series of grinders supported from the column above the pan; a weighted lever for each of said grinders, said levers being pivoted at their inner ends to the column; bell-cranks pivotally supported by the column; a rod connecting each of said bell-cranks to the corresponding weighted lever above; and a roller carried by each of the bell-cranks in line with the cam-surface formed upon the hub of the pan.

24. In a grinding-machine, the combination of a column; a pan rotatable about the same; means for imparting a step-by-step movement to said pan; a cam-surface formed upon the upper face of the hub of the pan; a series of grinders supported from the column above the pan; a weighted lever for each of said grinders, said levers being pivoted at their inner ends to the column; bell-cranks pivotally supported by the column; a rod connecting each of said bell-cranks to the corresponding weighted lever above; a roller carried by each of the bell-cranks in line with the cam-surface formed upon the hub of the pan; and a stop for limiting the descent of each weighted lever.

25. In a grinding-machine, the combination of a movable support; a blank-holder carried thereby; and an automatic discharging device for the blank carried by the holder, said device comprising means adapted to pass beneath the blank, elevate the same and discharge it at a point outside of the machine, substantially as described.

26. In a grinding-machine, the combination of a movable support; a blank-holder carried thereby; means for holding the blank thereon; and an automatic discharging device for the blank, comprising means adapted to pass beneath the blank, elevate the same and move it to a point outside of the machine.

27. In a grinding-machine, the combination of a movable support; a blank-holder carried thereby; means carried by the holder for maintaining the blank against displacement; and a discharging device for the blank, comprising means adapted to pass beneath the blank, elevate the same from the holder and move it to a point outside of the machine.

28. In a grinding-machine, the combination of a movable support; a blank-holder carried thereby and provided with supporting-posts and a retaining-pin adapted to pass through an opening in the blank; and a discharging device for the blank, comprising a pivoted chute having fingers at its inner end which pass between the posts and in rear of the blank, and means for swinging the inner end of said chute upwardly, first releasing the blank, and then moving it outwardly to discharge the blank at a point outside of the machine.

29. In a grinding-machine, the combination of a movable support; a blank-holder carried thereby, said holder being provided with separated posts and a retaining-pin for the blank; and a discharging device, comprising a chute having fingers at its inner end adapted to pass beneath the blank and in rear thereof, said chute being supported upon levers L', L', means for swinging said levers, and means for depressing the outer end of the chute, substantially as described.

30. An automatic discharging device for finished blanks, comprising a chute having engaging and retaining fingers at its inner end, a pivoted support for said chute, means for rocking said support about its pivot and thereby imparting an endwise movement to the chute, and means for tilting the chute about its fulcrum.

31. A discharging device for finished blanks, comprising a chute having retaining-fingers at its inner end for the blank; a rocking support for said chute comprising levers L', L', a cam, and connections intermediate the cam and said levers, whereby the latter may be rocked; and means for swinging the chute about its pivot, comprising a link, a bell-crank lever, a cam, and connections intermediate said cam and bell-crank lever, the cams being so timed with relation to each other that the inner end of the chute is first raised to a slight extent, then moved outwardly, and swung bodily upward, substantially as described.

32. In a grinding-machine, the combination of a suitable pan or support; a series of blank-holders carried thereby; a series of grinders; means for elevating said grinders; a series of clamps, one for each holder; means for imparting a step-by-step movement to the pan; a locking device for the pan; a releasing device for the clamps; and an automatic discharging mechanism, the parts being so arranged that the machine operates upon a series of blanks to grind them as required and automatically discharge the same one by one as they are finished.

33. In a grinding-machine, the combination of a suitable pan or support; a series of blank-holders carried thereby; a series of clamps for the blanks, one for each holder; a series of grinders; means for elevating said grinders from the blanks at predetermined intervals; means for advancing the pan step by step when the grinders are elevated; a locking device for the pan acting to hold the same against rotation while the grinders are in action; a releasing device for the clamps for elevating the same successively as a holder with a finished blank thereon passes from the final grinder; and means for engaging said blanks and automatically discharging them at a point outside of the machine.

34. In a grinding-machine, the combination of a pan; a holder carried thereby; a grinder working in the pan over said holder; and a hood surrounding the grinder and extending down into the water in the pan.

35. In a grinding-machine, the combination of a pan or support; a series of blank-holders carried thereby; a plurality of grinders working in line with said holders; means for rotating said grinders; means for moving said grinders into contact with and away from the articles or blanks to be ground, said articles or blanks being supported or held by the blank-holders; and means for advancing the pan or support when the grinders have been removed from the articles or blanks to be ground.

36. In a grinding-machine, the combination of a support; a series of blank-holders carried thereby; a series of rotating abrasive or grinding wheels for grinding the broad or flat sides of a knife-blade; a second series of rotating abrasive or grinding wheels arranged at an angle to the wheels of the first series, said second series of wheels grinding the chamfer or angle at the edge of the back of the knife-blade; and means for traversing the holders from one wheel to another.

37. In a grinding-machine, the combination of a pan or support; a series of blank-holders carried thereby; a series of rotating abrasive or grinding wheels for grinding the flat face of the knife-blade supported upon said holders; a second grinder arranged at an angle to the working plane of the first grinder, said second grinder acting upon the back edge of the blade to form an angle thereon; and means for traversing the holders from one grinder to another.

38. In a grinding-machine, the combination of a suitable support for sustaining the blanks; a blank-holder carried thereby; a rotary grinder having its axis in a plane at right angles to the direction of movement of the support; and a second grinder having its axis of rotation at an angle to the plane of movement of said support, substantially as described.

39. In a grinding-machine, the combination of a suitable support; a series of grinders having their axes of rotation in a plane at right angles to the direction of movement of said support; a second series of grinders having their axes of rotation at an angle to the plane of movement of said support, all of said grinders in both series acting simultaneously upon the blanks presented thereto; means for raising and lowering said grinders simultaneously; and means for advancing the support step by step, substantially as described.

40. In a grinding-machine, the combination of a series of face-grinders; a series of angle-grinders, the grinders of each series acting to remove a predetermined amount of stock; means for advancing the blanks from one grinder to the next; and means for simultaneously elevating the grinders and lowering the same when the blanks have moved from one position to the next.

41. In a grinding-machine, the combination of a vertical column; a pan-shaped member arranged about said column; means for intermittently rotating said member; a series of blank or blade holders carried by said pan-shaped member, the holders being so arranged that the blanks carried thereby shall be subjected to a greater or less extent to the fluid contained within the pan; means for retaining or holding the blades upon said holders; means for releasing the blades; means for discharging the blades from the holders successively and placing them outside of the pan-shaped member; a plurality of revolving abrasive or grinding wheels, the axes of said wheels standing in a plane at right angles to the pan-shaped member, the wheels being so positioned as to come into contact with the blanks carried by the holders when said wheels are lowered; a second series of revolving abrasive or grinding wheels whose axes are arranged at an angle to the horizontal plane of the pan-shaped member; means for varying the axial position of said wheels; means for securing a bodily adjustment of the angle-grinders toward and from the vertical column; means for intermittently but simultaneously moving the abrasive or grinding wheels to and from the holders and the articles held thereon; and means for determining the amount of said movement.

42. In a grinding-machine, the combination of a suitable support; and a blade-holder, the face of said holder standing at an angle to the plane of movement of the support, substantially as described.

43. In a grinding-machine, the combination of a suitable support; a series of grinders working above the same; the axes of the grinders standing in a plane at right angles to the direction of movement of the support; means for securing independent vertical adjustment of said grinders; and a series of independently-adjustable rotating grinders whose axes are at an angle other than ninety degrees to the plane of movement of the support; substantially as described.

44. In a grinding-machine, the combination of a supporting member; a series of face-grinders adapted and arranged to grind the face of a blade or blank carried by said supporting member; and a series of angle-grinders whose faces are so shaped as to grind the back and end of the blade to the desired form, substantially as described.

In testimony whereof I have signed my name to this specification in the presence of two subscribing witnesses.

HANSON ROBINSON.

Witnesses:
JULIUS W. FISCHER,
HARRY L. MILLER.